United States Patent
Harris et al.

(10) Patent No.: US 6,789,990 B1
(45) Date of Patent: Sep. 14, 2004

(54) FASTENER DEVICE

(76) Inventors: Paul Anthony Reginald Harris, deceased, late of Tisbury (GB); Maureen Harris, legal representative, "Cloneen", Hindon Lane, Tisbury, Wiltshire (GB), SP3 6PU ( * ) Notice: Subject to any disclaimer, the term of this patent is extended or adjusted under 35 U.S.C. 154(b) by 177 days.

(21) Appl. No.: 10/027,176

(22) Filed: Dec. 20, 2001

Related U.S. Application Data

(63) Continuation of application No. 09/807,578, filed as application No. PCT/GB99/03354 on Oct. 8, 1999, now abandoned.

(51) Int. Cl.[7] ............................................. F16B 39/30
(52) U.S. Cl. ..................... 411/206; 411/14; 411/208; 411/221
(58) Field of Search ............................ 411/13, 14, 206, 411/207, 208, 217, 221

(56) References Cited

U.S. PATENT DOCUMENTS

| 675,991 | A | * | 6/1901 | White | 411/206 |
|---|---|---|---|---|---|
| 1,067,163 | A | * | 7/1913 | Broomfield | 411/207 |
| 1,067,367 | A | * | 7/1913 | Noster | 411/207 X |
| 4,293,256 | A | | 10/1981 | Pamer | |
| 4,293,257 | A | | 10/1981 | Peterson | |
| 6,206,625 | B1 | * | 3/2001 | Dessouroux | 411/208 |

FOREIGN PATENT DOCUMENTS

| DE | 3107917 A1 | 12/1982 |
|---|---|---|
| DE | 4340504 A1 | 6/1994 |

* cited by examiner

Primary Examiner—Neill Wilson
(74) Attorney, Agent, or Firm—Iandiorio & Teska

(57) ABSTRACT

A fastener device comprising a nut, a threaded member for receiving the nut, and visual indicator means for visually indicating if the nut has become loose on the threaded member during use of the fastener device. The visual indicator means may comprise an indicator member which is mounted on the nut, biasing means which biases the indicator member to an indicating position in which the indicator member gives a visual indication that the nut has become loose, and at least one recess into which the indicator member is moved by the biasing means consequent upon the nut becoming loose, the indicator member then being in the indicating position.

12 Claims, 6 Drawing Sheets

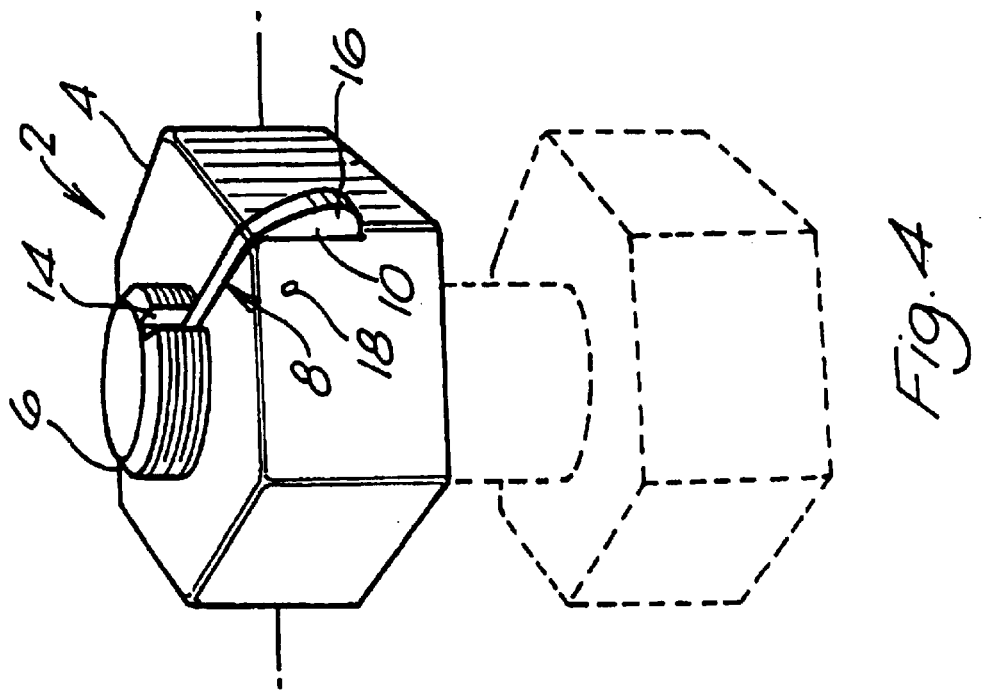
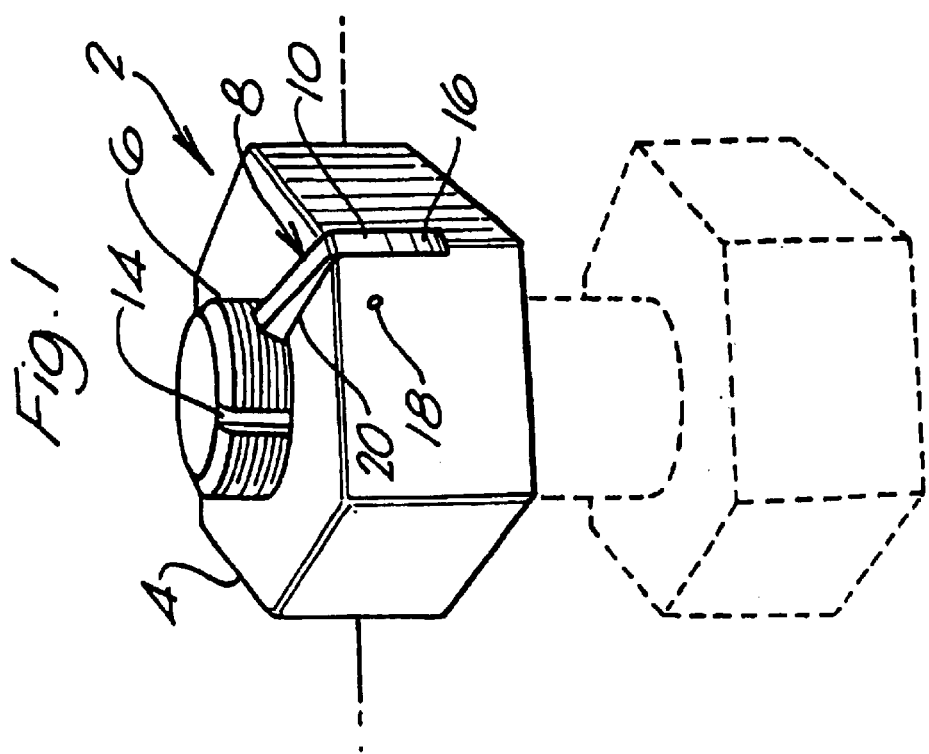

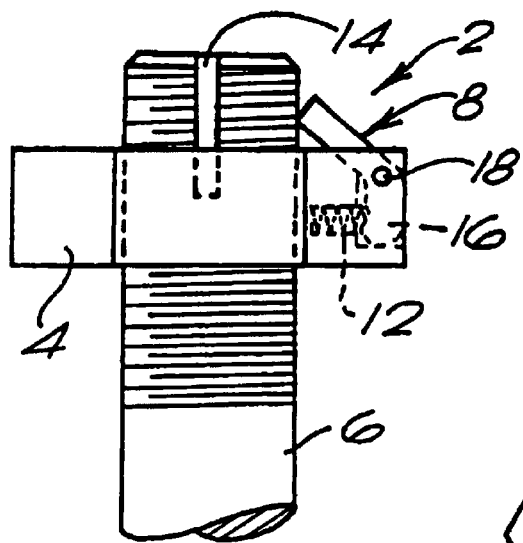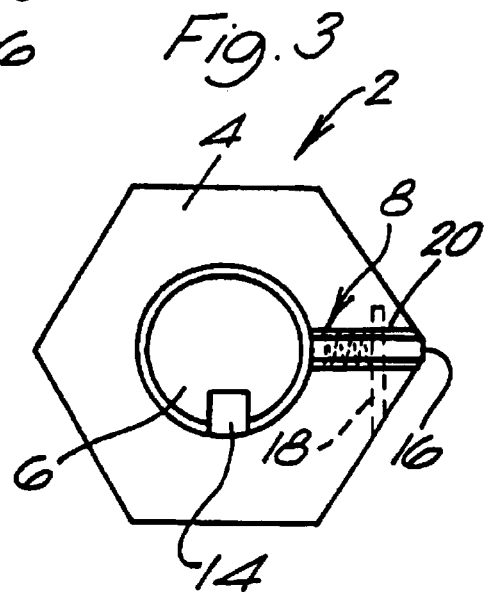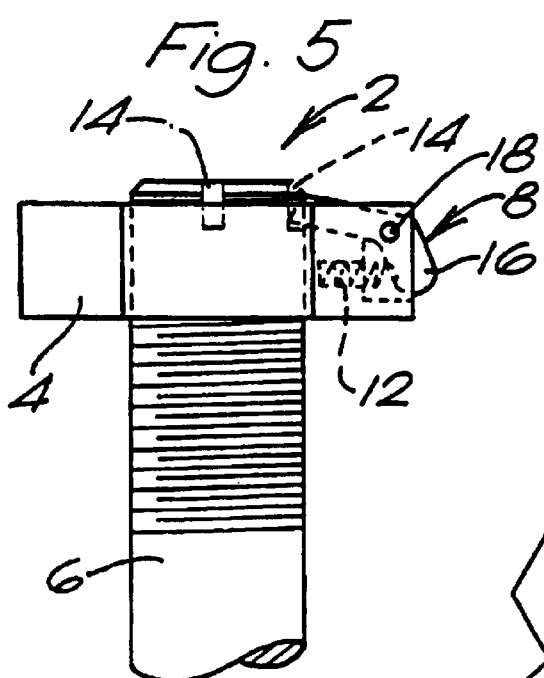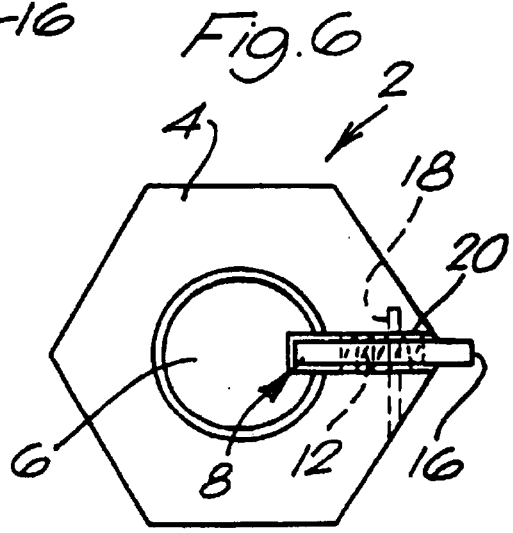

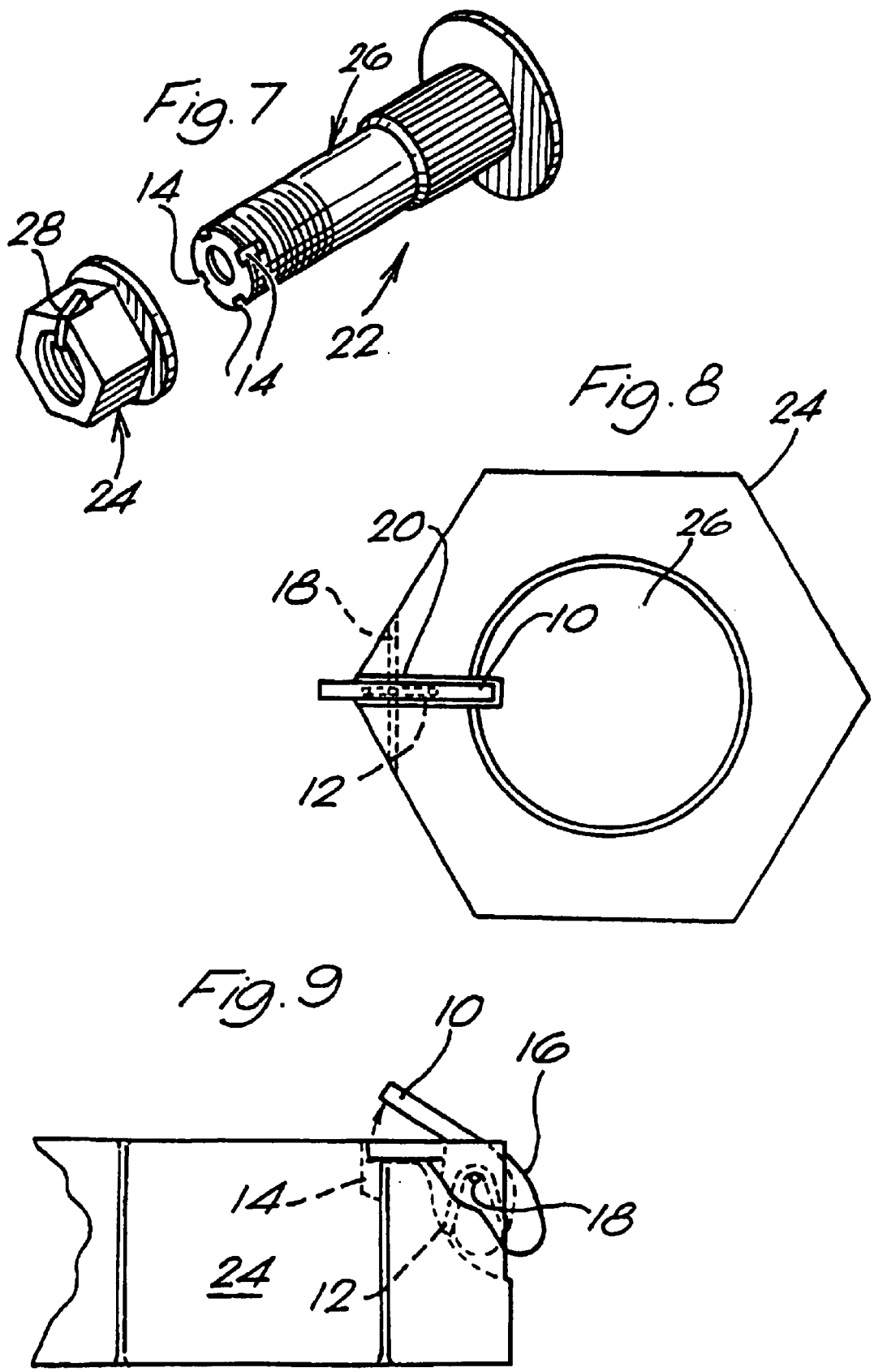

FASTENER DEVICE

RELATED APPLICATIONS

This application is a continuation of U.S. patent application Ser. No. 09/807,578 filed Apr. 13, 2001 now abandoned which is a PCT/GB99/03354 filed Oct. 8, 1999.

FIELD OF THE INVENTION

This invention relates to a fastener device.

BACKGROUND OF THE INVENTION

Fastener devices comprising a threaded member for receiving a nut are well known. Such fastener devices are widely used in many applications ranging, for example, from retaining wheels in position on motor vehicles and aircraft to retaining steel girders in position in buildings. There is often a problem with the known fastener devices in that the nuts tend to work loose, for example due to the effects of vibration.

SUMMARY OF THE INVENTION

It is an aim of the present invention to obviate or reduce the above mentioned problem.

Accordingly, the present invention provides a fastener device comprising a nut, a threaded member for receiving the nut, and visual indicator means for visually indicating if the nut has unintentionally become loose on the threaded member during use of the fastener device, the visual indicator means being such that it comprises an indicator member which is pivotally mounted on the nut, at least one recess in the threaded member, and biasing means which biases the indicator member into the recess and thereby to an indicating position in which the indicator member gives a visual indication that the nut has become loose, the biasing means being such that it firstly operates automatically consequent upon the nut becoming unintentionally loose and it secondly operates without a requirement for a tool for tightening, and loosening the nut to be placed over the nut, and the indicator member being such that when it is in the recess it prevents further unintentional loosening of the nut on the threaded member.

The visual indicator means provides a simple means of indicating if a nut has become loose. The nut can then be tightened as necessary.

The indicator member may include an indicator portion which extends proud of the nut when the indicator member is in the recess.

The fastener device may include a pivot member which pivotally mounts the indicator member on the nut such that the indicator member extends radially with respect to a threaded bore through the nut. Preferably, the pivot member pivotally mounts the indicator member in a slot in the nut.

The recess for receiving the indicator member is preferably a slot on the threaded member. Other types of recess may however be employed.

The fastener device may be one in which there are at least two of the recesses for receiving the indicator member. As many of the recesses as desired may be employed.

The fastener device may be one in which there is only one of the indicator members on the nut. Alternatively, the fastener device may be one in which there are at least two of the indicator members on the nut. Generally, as many of the indicator members may be employed as is required to achieve a required degree of visual awareness and/or safety.

The biasing means may be a coil spring. Alternatively, the biasing means may be a V-spring. Other types of biasing means may be employed.

Advantageously, at least a part of the indicator member is coloured so as to attract attention. The indicator member may thus be provided with a non-fluorescent colour or a fluorescent colour. More than one colour may be employed if desired. Where a colour is employed, then it is preferably employed on at least sides of the indicator member.

The visual indicator means may be made of a plastics material. Any suitable and appropriate plastics material may be employed, for example nylon. Materials other than plastics materials may be employed if desired.

The threaded member will usually be a bolt or a stud. The threaded member will usually be made of a metal but other materials including plastics materials may be employed.

The fastener device of the present invention may be used for retaining wheels in position on vehicles such for example as cars, vans, lorries, coaches and buses. The fastener device may also be used as a central fastener device for retaining wheels in position in racing vehicles. The fastener device may alternatively be used as part of scaffolding clamps, especially where vibration is likely to cause loosening of the clamps. The fastener device may still further be used in the construction industry for bolting girders together, or in the aircraft industry for retaining components together.

BRIEF DESCRIPTION OF THE DRAWINGS

Embodiments of the invention will now be described solely by way of example and with reference to the accompanying drawings in which:

FIG. 1 is a perspective view of a first fastener device in a tightened condition;

FIG. 2 is a sectional view through part of the fastener device in the condition shown in FIG. 1;

FIG. 3 is a top plan view of the fastener device in the condition shown in FIG. 1;

FIG. 4 shows the first fastener device in a loosened condition;

FIG. 5 is a section through part of the fastener device in the loosened condition shown in FIG. 4;

FIG. 6 is a top plan view of the fastener device in the loosened condition shown in FIG. 4;

FIG. 7 is a perspective view of a second fastener device;

FIG. 8 is a top plan view of a third fastener device;

FIG. 9 is a section through part of the fastener device shown in FIG. 8;

DETAILED DESCRIPTION OF THE DRAWINGS

Figure 10:
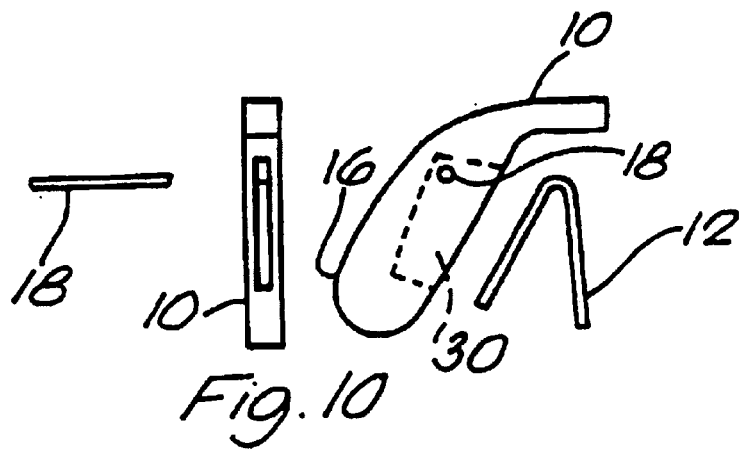
FIG. 10 is an exploded view of parts of the fastener device shown in FIG. 8.

Referring to FIGS. 1–6, there is shown a fastener device 2 comprising a nut 4, a threaded member 6 for receiving the nut 4, and visual indicator means 8. The visual indicator means 8 is for visually indicating if the nut 4 has become loose on the threaded member 6 during use of the fastener device 2.

The visual indicator means 8 comprises an indicator member 10 which is mounted on the nut 4, and biasing means 12 which biases the indicator member 10 to an indicating position in which the indicator member 10 gives a visual indication that the nut 4 has become loose. This indicating position is shown in FIGS. 4, 5 and 6. The visual indicator means 8 also comprises a recess 14 into which the indicator member 10 is moved by the biasing means 12 consequent upon the nut 4 becoming loose. When the indicator member 10 moves into the recess 14, then the indicator member 10 is in the indicating position.

The indicator member 10 includes an indicator portion 16 which moves to the indicating position.

A pivot member 18 pivotally mounts the indicator member 10 on the nut 4 such that the indicator member 10 extends radially with respect to a threaded bore through the nut 4. More specifically, the pivot member 18 pivotally mounts the indicator member 10 in a slot 20 in the nut 4.

The recess 14 for receiving the indicator member 10 is in the form of a slot. The recess 14 is on the threaded member 6.

FIG. 5 shows in dotted lines a second recess 14. This illustrates an optional alternative to having only one recess 14. Generally, as many recesses 14 as may be required can be employed.

As can be seen from FIGS. 1–6, there is only one indicator member 10 on the nut 4. It desired however in alternative embodiments of the fastener device 2, two or more of the indicator members 10 may be employed on the nut 4.

As shown in FIGS. 2, 3, 5 and 6 the biasing means 12 is in the form of a coil spring.

If desired, at least a part of the indicator member 10 may be coloured 60 as to attract attention. Preferred parts of the indicator member 10 that are coloured are the sides of the indicator portion 16.

The visual indicator means 8 is preferably made of a plastics material but other materials may be employed if desired. The threaded member 6 may be in the form of a bolt or a stud, and it will usually be made of a metal but other materials may be employed if desired.

Referring to FIGS. 7–10, there is shown a second fastener device 22 comprising a nut 24 and a threaded member 26. The threaded member 26 is in the form of a typical stud for a wheel of a truck, the threaded member 6 being modified to include four of the recesses 14. The nut 24 has visual indicator means 28. The visual indicator means 2B is similar to the visual indicator means 8 and similar parts have been given the same reference numerals for ease of comparison and understanding. As can be seen from FIGS. 8 and 9, the biasing means 12 is in the form of a V-spring which passes over the pivot member 18. As best shown in FIG. 10, one leg of the V-spring 12 locates in an undercut portion 30 in the indicator member 10. This then enables the other leg of the V-spring to press against the indicator member 10. With four of the slots 14, then maximum loosening cannot exceed 90°.

Figure 11:
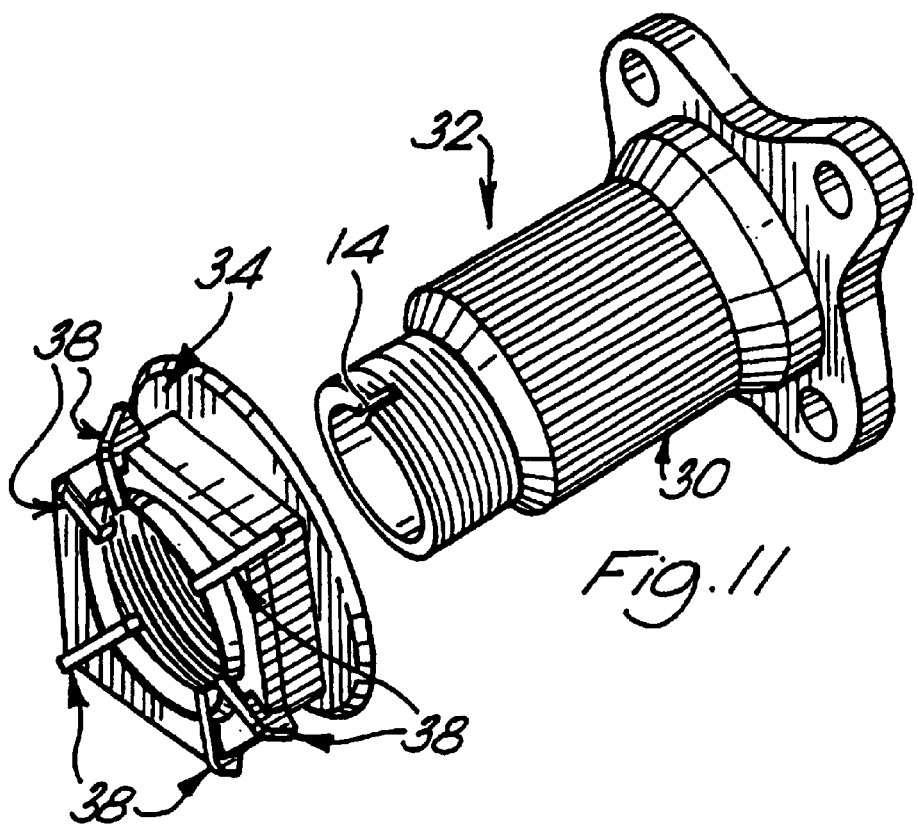
FIG. 11 is a perspective view of a third fastener device.
Figure 12:
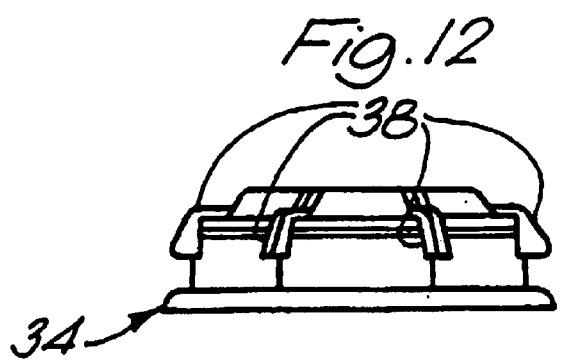
FIG. 12 is a side view of a nut part of the fastener device shown in FIG. 11.
Figure 13:
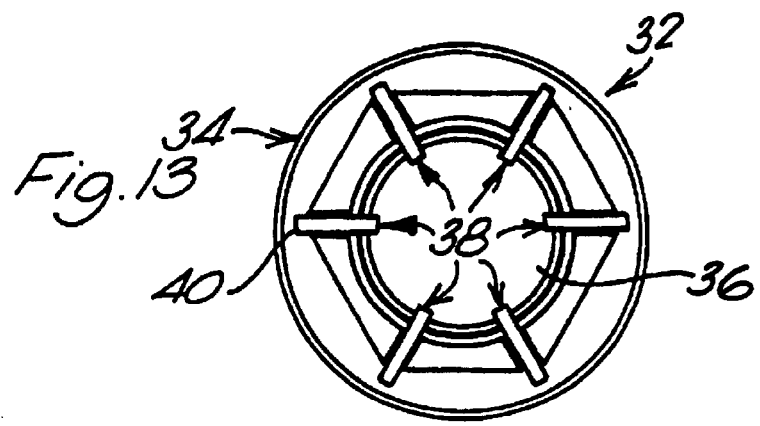
FIG. 13 is a top plan view of the fastener device shown in FIG. 11.
Figure 14:
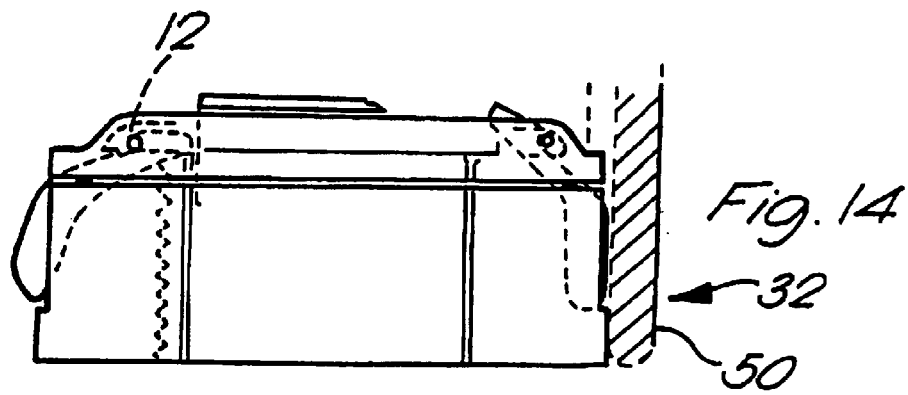
FIG. 14 is a side view of part of the fastener device shown in FIG. 11 and illustrates how the fastener device is used with a socket spanner.
Figure 15:
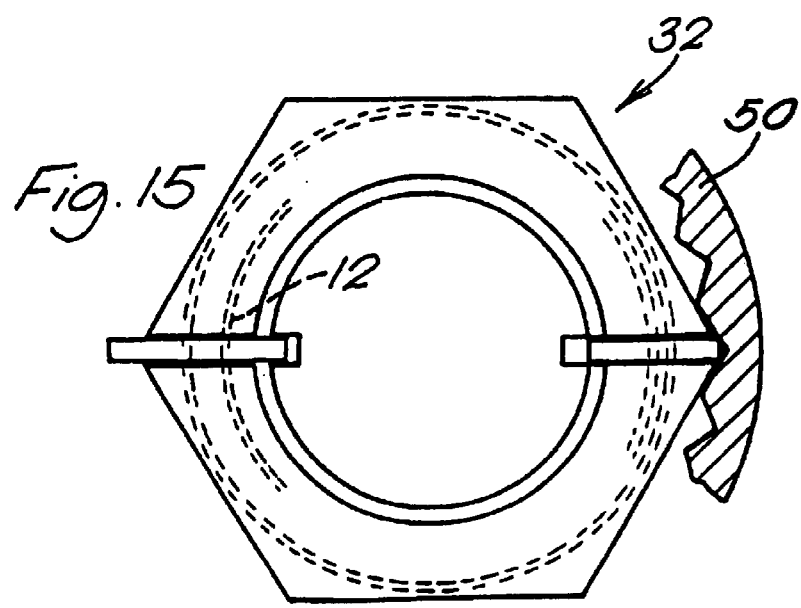
FIG. 15 is a top plan view of the part of the fastener device as shown in FIG. 14.
Figure 16:
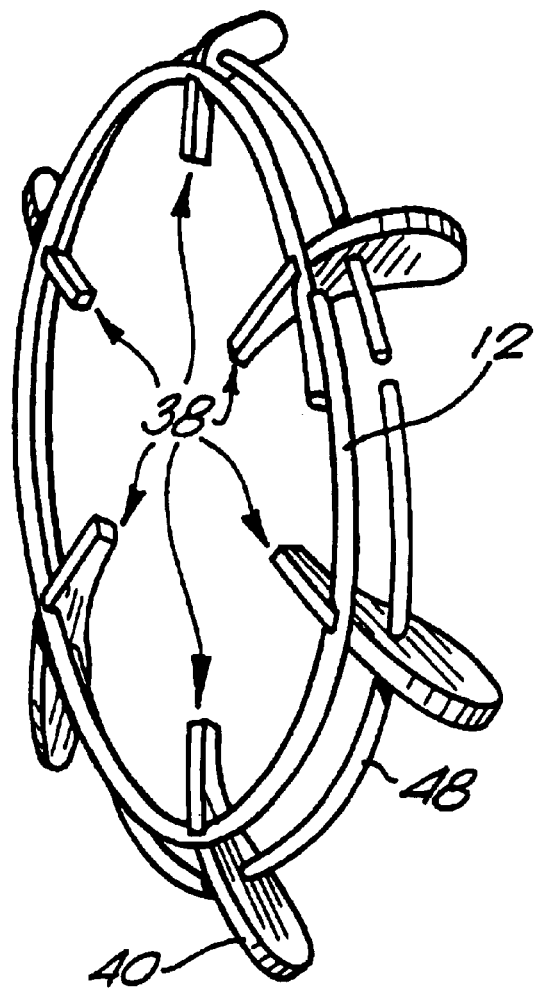
FIG. 16 is a perspective view of visual indicator means employed in the fastener device shown in FIG. 11.
Figure 17:
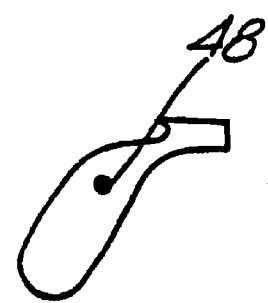
FIG. 17 shows part of the visual indicator means shown in FIG. 16.

Referring now to FIGS. 11–17 there is shown a third fastener device 32 comprising a nut 34, a threaded member 36 and six separate visual indicator means 38. The visual indicator means 38 are each constructed as show most clearly in FIGS. 12, 13, 16 and 17. It will be seen that each visual indicator means 38 comprises a visual indicator member 40 and a pivot member 48 which is ring shaped as best shown in FIG. 16. The biasing means 12 is in the form of a ring shaped spring, again as best shown in FIG. 16. The arrangement shown in FIG. 16 fits over the nut 34 as best shown in FIGS. 11 and 12.

FIGS. 14 and 15 illustrate how a socket spanner 50 can be employed to force the six indicator members 10 inwardly for tightening purposes. With six of the indicator members 10, maximum loosening of the nut 4 cannot exceed 60°.

It is to be appreciated that the embodiments of the invention described above with reference to the accompanying drawings have been given by way of example only and that modifications may be effected. Thus, different types of threaded member 6, 26, 36 may be employed, depending upon the various intended uses of the fastener devices 2, 22, 32. The illustrated four slots 14 shown in the drawings may be more or less slots. Generally there may be from 1–6 slots, for example three slots. The spring and hinge arrangement shown for example in FIG. 16 may be made in one piece instead of two pieces.

What is claimed is:

1. A fastener device comprising a nut, a threaded member for receiving the nut, and visual indicator means for visually indicating if the nut has unintentionally become loose on the threaded member during use of the fastener device, the visual indicator means being such that it comprises an indicator member which is pivotally mounted on the nut, at least one recess in the threaded member, and biasing means which biases the indicator member into the recess and thereby to an indicating position in which the indicator member gives a visual indication that the nut has become loose, the biasing means being such that it firstly operates automatically consequent upon the nut becoming unintentionally loose and it secondly operates without a requirement for a tool for tightening and loosening the nut to be placed over the nut, and the indicator member being such that when it is in the recess it prevents further unintentional loosening of the nut on the threaded member.

2. A fastener device according to claim 1 in which the indicator member includes an indicator portion which extends proud of the nut when the indicator member is in the recess.

3. A fastener device according to claim 2 and including a pivot member which pivotally mounts the indicator member on the nut such that the indicator member extends radially with respect to a threaded bore through the nut.

4. A fastener device according to claim 3 in which the pivot member pivotally mounts the indicator member in a slot in the nut.

5. A fastener device according to claim 1 in which the recess for receiving the indicator member is a slot on the threaded member.

6. A fastener device according to claim 1 in which there are at least two of the recesses for receiving the indicator member.

7. A fastener device according to claim 1 in which there is only one of the indicator members on the nut.

8. A fastener device according to claim 1 in which there are at least two of the indicator members of the nut.

9. A fastener device according to claim 1 in which the biasing means is a coil spring or a V-spring.

10. A fastener device according to claim 1 in which at least a part the indicator member is coloured so as to attract attention.

11. A fastener device according to claim 1 in which the visual indicator means is made of a plastics material.

12. A fastener device according to claim 1 and in which the threaded member is a bolt or a stud.

* * * * *